United States Patent [19]

Nowak

[11] 3,747,765
[45] July 24, 1973

[54] RIGID FILTER ASSEMBLY
[75] Inventor: Thomas A. Nowak, Livermore, Calif.
[73] Assignee: Kaiser Aluminum & Chemical Corporation, Oakland, Calif.
[22] Filed: June 9, 1971
[21] Appl. No.: 151,369

[52] U.S. Cl.................. 210/238, 210/323, 210/510
[51] Int. Cl...................... B01d 29/20, C04b 21/00
[58] Field of Search .............. 106/63; 55/502, 503, 55/523, 524; 210/153, 459, 484, 496, 504, 506, 510, 232

[56] References Cited
UNITED STATES PATENTS

| | | | |
|---|---|---|---|
| 3,524,548 | 8/1970 | McDonald et al. | 210/153 |
| 457,008 | 8/1891 | Oster | 210/459 X |
| 2,997,402 | 8/1961 | McDonald et al. | 106/63 |
| 1,293,114 | 2/1919 | Kendrick | 210/459 X |
| 455,620 | 7/1891 | Hershberger | 210/459 |

Primary Examiner—Samih N. Zaharna
Assistant Examiner—T. A. Granger
Attorney—Paul Cabrow et al.

[57] ABSTRACT

Filter assembly for filtering solids from molten aluminum metal comprises at least one open-ended rigid refractory filter tube having an interior passageway, a bottom plate acting to close one end of such tube, a top plate having an aperture communicating with the interior passageway of such filter tube, and means, such as a tie bolt, with a fastener device to maintain the top and bottom plate and the interposed filter tube or tubes in sealed relationship so that the molten metal will flow through the walls of the rigid refractory filter tube without leakage at the ends or joints, to efficiently remove solid contaminants from the metal. The plates and tie rod or the like are of metal resistant to attack by molten aluminum, advantageously of cast iron. The refractory material of the tubes contains refractory particles resistant to molten aluminum and a bonding agent containing not over 10 percent silica.

7 Claims, 12 Drawing Figures

PATENTED JUL 24 1973

INVENTOR.
THOMAS A. NOWAK
BY Frank M Hansen
PATENT ATTORNEY

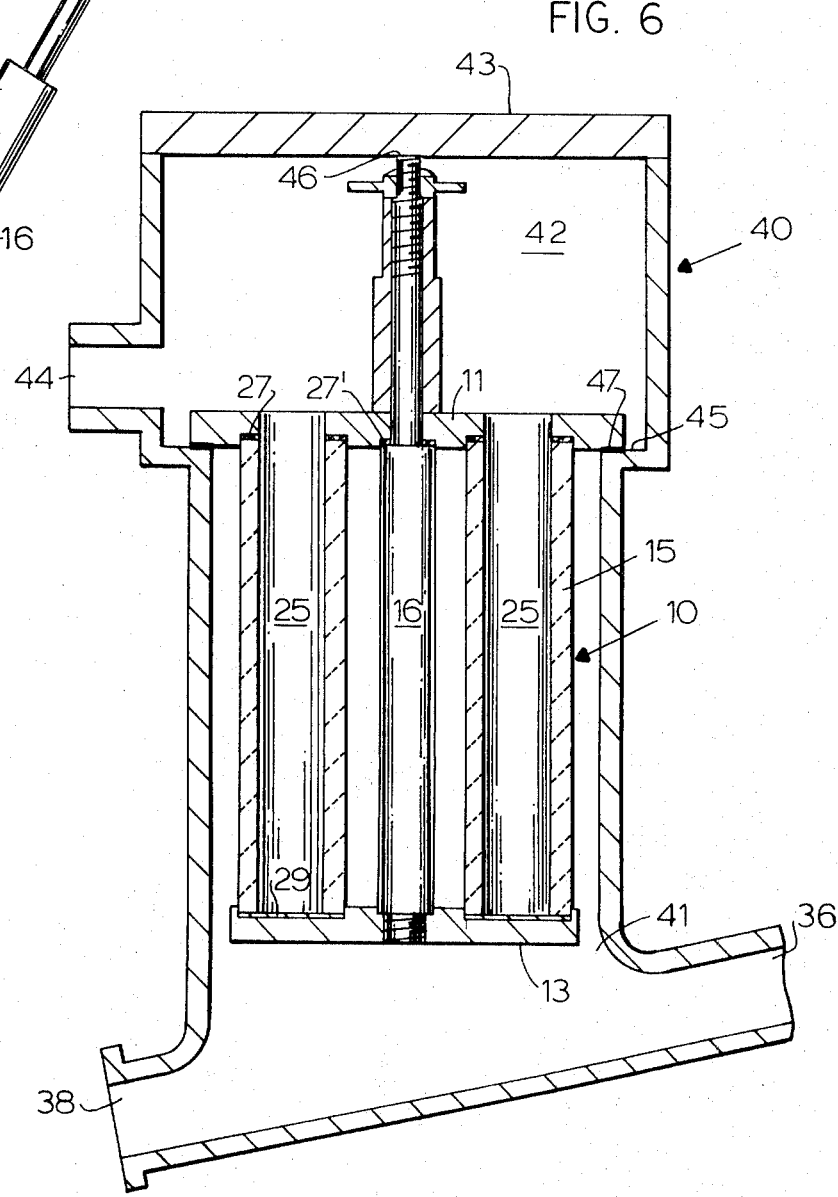

PATENTED JUL 24 1973 3,747,765

INVENTOR.
THOMAS A. NOWAK
BY *Frank M Hansen*
PATENT ATTORNEY

PATENTED JUL 24 1973 3,747,765

INVENTOR.
THOMAS A. NOWAK
BY Frank M Hansen
PATENT ATTORNEY

RIGID FILTER ASSEMBLY

BACKGROUND OF THE INVENTION

Molten aluminum in practice generally contains entrained solids which are deleterious to the final cast metal product. These entrained solids usually derive from three sources. Some are particles of aluminum oxide which are drawn into the liquid stream from the floating oxide layer on the surface, and some entrained particles are fragments of furnace lining, transfer trough and other portions of the molten aluminum handling equipment which are eroded and entrained in the flowing aluminum stream; and some particles are precipitates of insoluble impurities such as intermetallic compounds, borides, carbides or precipitates of other aluminum compounds, such as aluminum chloride. When these inclusions appear in the final cast product after the molten aluminum is solidified, they cause such final product to be less ductile, have lower strength or to have poor finishing characteristics. Accordingly, it is desirable to remove entrained solids from the molten aluminum stream before it is cast into a solid body which may be used as such or subjected to forming operations such as rolling, forging, extrusions, etc.

Filtering processes to remove entrained solids from liquids are accomplished by passing the solid-laden liquid through a porous filter medium that will not pass the solids. Filtering molten metal in general, and molten aluminum in particular, creates special problems because the liquid is so aggressive that it is difficult to find a filter medium capable of withstanding it. To avoid problems of deteriorating filter media, molten aluminum can be filtered through a bed of alumina particles.

In general, two methods of filtering are used for removing entrained solids from molten aluminum alloys before casting. The most common filter medium is an open weave glass cloth screen placed in the metal transfer trough, around the spout or even in the molten metal pool in the top of the solidfying ingot. These cloth screens are able to remove only the larger sizes of inclusions from the metal and are easily ruptured during use because the glass fibers become very weak at the temperature of molten aluminum. In another prior art procedure, molten aluminum is filtered through a bed of loose alumina particles, for example, of tabular alumina, but it often suffers from the drawbacks normally associated with bed filters in that it passes too many solids, there is a strong tendency to channeling which prevents efficient use, and pore size of the filter is not easily controlled but rather readily changes under conditions of use so that, even when originally of proper dimension, it cannot be efficiently maintained.

In U.S. Pat. No. 3,524,548, there has been disclosed a rigid porous filter for filtering molten aluminum which comprises a fired mixture of particles of refractory materials resistant to molten aluminum and a bonding agent of vitreous material containing not over 10 percent silica; and which advantageously comprises refractory particles of average particle size from about 0.165 mm. to 2.8 mm. and whereof the vitreous material comprises advantageously from 15% to 80% boron oxide, from 5% to 50% calcium oxide and from 2% to 60% aluminum oxide, and is present in an amount from 4% to 20% of the total fired mix. That patent discloses a number of devices incorporating the advantageous refractory filter medium in fired shaped form but it has been found that such rigid media filter tubes or elements are rather fragile and subject to breakage when a twisting or bending stress is applied. In order to reduce the cost of operation with this filter medium, therefore, it has been desired to develop a device which will enable efficient us of the rigid media filter element with reduction of breakage thereof and, consequently, reduction in the cost of operation for this material. Such a device has now been developed and has the advantages of lower cost operation, reduction in breakage with very extended life of the filter tubes, and other advantages which will become apparent from the description below.

SUMMARY OF THE INVENTION

According to the present invention, there is provided a demountable cartridge for filtering molten aluminum which comprises in combination a top plate, a bottom plate, at least one and advantageously a plurality of rigid filter tubes or elements disposed between such plates, and means for fastening the assembly together and for maintaining the filter media and top and bottom plates in sealed relation with each other. Suitable rigid filter elements are described in McDonald et al., U.S. Pat. No. 3,524,548, which issued Aug. 18, 1970. As there described, the rigid filter medium is a fired, shaped article which includes a granular refractory material compatible with molten aluminum, such as alumina, fused alumina, high purity bauxite or diaspore, boron nitride or other suitable refractory material which is known to resist attack by molten aluminum. The granular material is bonded together with a vitreous material containing less than 10% silica and particularly as containing from 15% to 80% boron oxide, from 5% to 50% calcium and from 2% to 60% aluminum oxide and not more than 10% silica. From 4% to 20% of the bonding material is advantageously used in making the rigid filter media. This suitable bonding material is described in U.S. Pat. No. 2,997,402, issued Aug. 22, 1961, in the names of Howard A. McDonald and James E. Dore.

The rigid filter media made, as described in U.S. Pat. 3,524,548 are excellent filter means for molten aluminum metal but are rather fragile and care must be taken in the handling and use of the filters or cartridges in order to avoid breaking or shattering, with consequent increase in costs of operation.

The device of the present invention enables more efficient handling of the rigid media filter and cartridge and reduces breakage loss significantly. The plates and tubes are quickly assembled, and this can be done by labor of minimum skill or training. The device can be picked up and is ready for placement because it is not necessary to wait for mortar joints to set. The cartridge can be readily disassembled when necessary or when the casting operation has been completed, by loosening the means holding the plates, tubes and tie rod together, lifting off the top plate and removing the used filter tubes.

A particular advantage of the filter cartridge of this invention is that such a cartridge has been found to have several times the useable working life of a comparable but all-ceramic cartridge. Furthermore, when breakage or exhaustion of the filter element occurs, the cast iron parts of the device of the present invention can be re-used with replacement of several sets of the ceramic filter tubes. A most important advantage of this invention is the ability to pick up the assembled cartridge with a simple hook by lifting on the tie rod or bar. Previous all-ceramic assemblies were picked up by complicated three-point tongs which were difficult to operate at high temperatures. The all-ceramic assemblies were usually picked up by the top plate and if the mortar joints failed, the entire cartridge was dropped and destroyed.

Another advantage is the ability of the device of the present invention to withstand faster preheat rates, thereby reducing operating times and costs. Another advantage is that cartridge shapes other than those of round horizontal cross section are easily assembled, thereby increasing the cartridge capacity with a minimum increase in the space required.

BRIEF DESCRIPTION OF THE DRAWINGS

The invention and some modes of carrying it out will be illustrated and described by the following specific description and by the annexed drawings in which:

FIG. 5 is a perspective view of one embodiment of a tie rod of the assembly of FIG. 1;

FIG. 6 is a vertical cross-sectional view of one embodiment of the assembly of this invention, showing it in place in a filtering zone or unit, and ready for use;

FIG. 7 is a vertical cross-sectional view showing another embodiment of a tie rod according to this invention, showing the rod in position with respect to a bottom plate of the assembly of this invention;

DETAILED DESCRIPTION OF THE INVENTION

Figure 1:
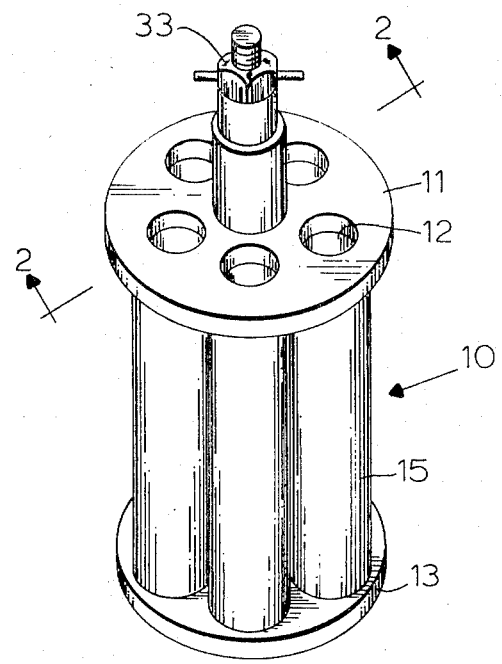
FIG. 1 depicts one embodiment of the filter cartridge device of this invention in assembly, in a perspective view.
Figure 2:
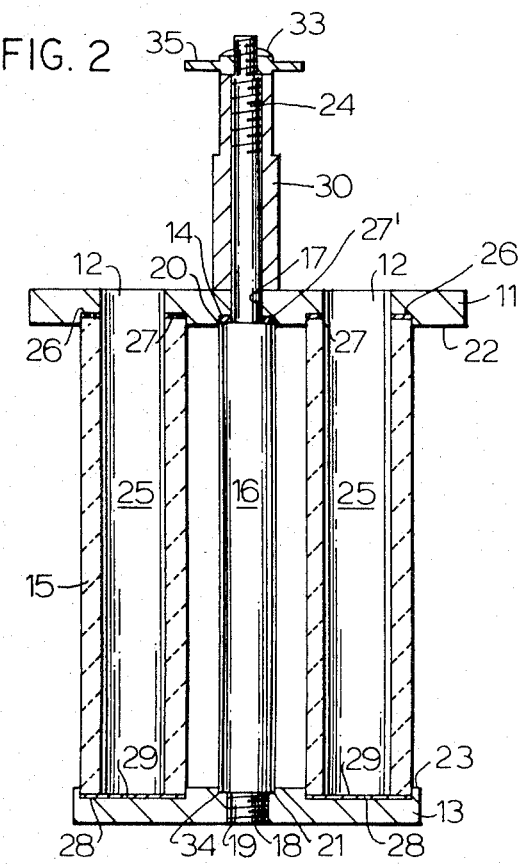
FIG. 2 is a cross-section of the assembly of FIG. 1, taken on line 2—2.
Figure 3:
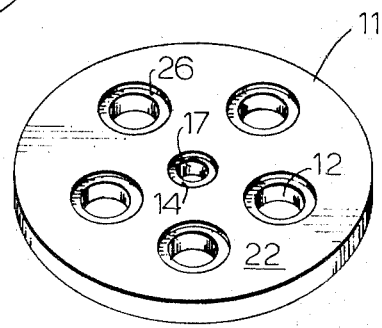
FIG. 3 is a perspective view toward the lower surface of the top plate of the assembly shown in FIG. 1.
Figure 4:
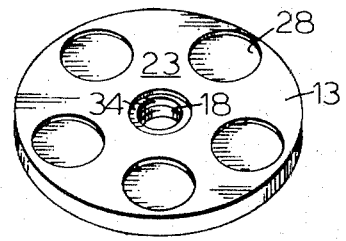
FIG. 4 is a perspective view toward the top surface of the bottom plate of the device of FIG. 1.

In the embodiment of a filter device shown in FIGS. 1-5, the demountable assembly 10 includes a top plate 11 having in it a plurality of holes or apertures 12 and a bottom plate 13, both plates being of cast iron. Disposed between the plates and sealed respectively to the lower surface 22 of plate 11 and the upper surface of plate 13 are a number of filter tubes 15 of the rigid fired refractory material hereinabove. That is to say, these tubes consist essentially of a shaped, fired admixture of alumina particles having a maximum diameter of between 1.165 mm. and 2.8 mm., bonded with from 4% to 20% of a prefused vitreous bonding material containing from 15% to 80% boron oxide, from 5% to 50% calcium oxide and from 2% to 60% aluminum oxide, and not more than 10% silica. As shown in FIG. 2, plates 11 and 13 and tubes 15 are held firmly together by a tie rod 16 of the type shown in FIG. 5. Plates 11 and 13 are each provided with a central aperture at 17 and 18 respectively. In this embodiment, the walls of 18 are threaded and the lower end 19 of tie rod 16 is also threaded so that it can be threadedly connected tightly to plate 13 within aperture 18, tie rod 16 being circular in horizontal cross-section. Tie rod 16 is also provided with an annular shoulder 20 at its upper end, to fit into annular recess 14 in the lower surface 22 of top plate 11; and a lower annular shoulder 21 fits into recess 34 in upper surface 23 of lower plate 13. At its top end, tie rod 16 is provided with an extension 24 of reduced cross-section which extends through aperture 17 and upwardly from top plate 11. In this embodiment, the plates and tie rod are made of heat-resistant cast iron available in commerce under the trademark "Atlas Alloy 220," made and sold by Atlas Foundry, Tacoma, Wash.

Figure 8:
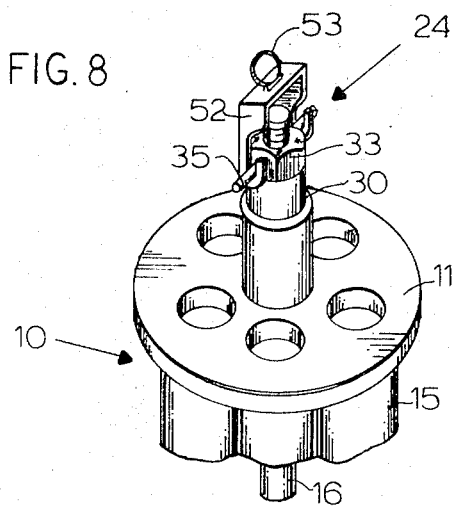
FIG. 8 shows a device for grasping, lifting and transporting a filter cartridge made according to the present invention.

Rigid filter tubes 15 are circular in horizontal cross-section in this embodiment, although the cross-sectional configuration is not critical and other shapes can be selected if desired. However, the circular cross-sectional tubes are generally most suitable to make and use. Each such tube 15 is provided with an internal passageway 25 which communicates with an aperture 12 in upper plate 11, the walls of passageway 25 and of aperture 12 being in alignment or registration so that a smooth flow of metal results. In this embodiment, an annular recess 26 is provided in the wall of each aperture 12 to accommodate or receive the upper end of tube 15 in such relationship. Interposed between the surface of plate 11 and the end of each tube 15 is a compressible, aluminum-compatible sealant material, which in this instance is a gasket 27 of Fiberfrax which is an alumina-silica fibrous sheet material useful at temperatures above 2,000° F. and made and sold by The Carborundum Company. Disposed in upper surface 23 of plate 13 are a number of circular recesses 28 which register with the apertures 12 in upper plate 11 and which receive the lower end of tubes 15. A sheet or disc 29 of a like sealant material, such as Fiberfrax, is interposed also between the surfaces of recesses 28 in plate 13 and the ends of tubes 15. A thicker layer 37' of Fiberfrax is also placed between the surface of upper plate 11 and the upper end of rod 16, because as rod 16 expands upon heating, this layer will compress accordingly and accommodate for such expansion. The upper portion, or extension 24 of rod 16 is at least partially threaded in this embodiment. In assemblying this device, tie rod 16 is threadedly connected to lower plate 13 and the required number of tubes 15 are set in their respective recesses 28, after which top plate 11 is placed over the tops of the tubes and tie rod 16, with suitable implacement of the Fiberfrax discs and gaskets, and the whole fastened together by suitable means. A sleeve 30 is placed over the upper extension 24 and a retaining nut 33 is screwed down over the upper portion of extension 24 to tighten sleeve 30 and extension 24 against plate 11 and to hold the entire assembly in secure attachment. Instead of the tightening nut 33, any other suitable quick-disconnect device can be used, e.g., a cam arrangement as will be described below. When the cartridge, is heated to the temperature of operation, the cast iron tie rod expands lengthwise more than the ceramic tubes so that the sleeve and top plate must be tightened against the tops of the filter tubes. Conversely, upon cooling after a drop or casting operation is finished, the fastening device is quickly loosened to permit adjusting again the position of the sleeve and plate. A pair of arms 35 extend outwardly from retaining nut 33 and, as shown in FIG. 8, assist in lifting and transporting the entire assembly. In FIG. 6 is shown the implacement of the device in the filtering zone or housing 40 having an entry pipe 36 for introduction of hot molten metal from a melting zone or the like and an outlet 38 provided with a suitable cap (not shown), to assist in draining and cleaning the device. The filter cartridge or assembly 10 made according to this invention is placed in filtering chamber 40 which includes lower or inlet portion 41 for introduction of hot metal coming through inlet 36, and upper or outlet chamber 42 which receives filtered metal from filter tubes 15 and conducts it to outlet 44, whence it flows to casting stations. Upon chamber 42 is provided with a lid or cover 43 so that the hot filtered metal is kept out of contact with the air. If desired, and advantageously, an inert gas can be introduced into chamber 42 above the level of the metal by conventional means to assist in maintaining non-oxidizing conditions. The top plate 11 of filter cartridge 10 rests at its outer edge of an annular shoulder 45 provided at the upper end of lower portion 41. Bottom plate 12 is supported by tie rod 16 and is of smaller diameter than top plate 11 and also of smaller diameter than the interior of lower portion 41 so that passageway for molten metal is provided around the circumference of lower plate 12. Other means of conducting molten metal into contact with filter tube 15, such as holes in plate 13 could be used, alternatively. The upper end 46 of tie rod 16 is at such distance from the upper surface of plate 11 that cover 43 rests on surface 46 and thereby plate 11 is held down in sealed connection with shoulder 45 against the force of metal being filtered through tube 15 when the device is in operation. Advantageously, compressible sealant gasket 47 is placed between shoulder 45 and the outer edge of plate 11 to ensure that no leakage will occur. Instead of a lid or cover, a bar across the top of outlet chamber 42 can serve to hold down the rod and cartridge.

In FIG. 7 there is shown an alternative lower portion of a tie rod useful herein. In this arrangement, tie rod 48 is provided at its lower end with a flange or disc-shaped end piece 49. Plate 13' is provided with the central aperture 18' and with an annular recess 50 at the lower end thereof so that the disc-shaped end 49 of tie rod 48 fits snugly into recess 50, the central stem of tie rod 48 extending upwardly through aperture 18' in plate 13'.

In FIG. 8 there is shown one means of grasping, lifting and transporting the filter cartridge of this invention, all but the top portion of the device being cut away for simplicity. In this embodiment, sleeve 30 is in place resting on plate 11 and held tightly against that plate by means of nut 33 which is screwed tightly against the top of sleeve 30. Extending arms 35 are provided on nut 33. A double-hooked grasping means 52 is slipped over arms 35, and is provided with a top eye or grasping means 53 by which the device can be lifted, either by hand or by suitable mechanical means. The grasping means 52 can be quickly disengaged when the device 10 is in place.

Figure 9:
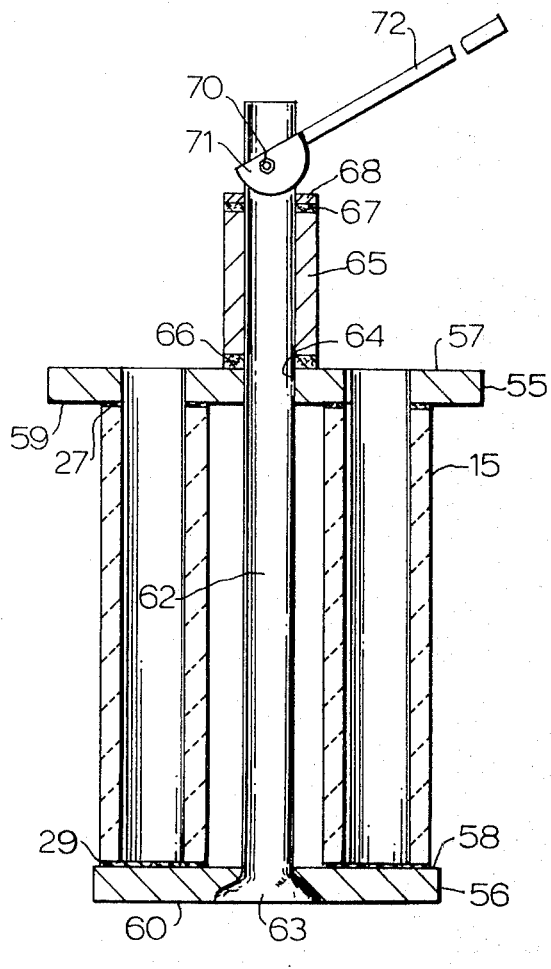
FIG. 9 is a cross-sectional elevation view showing another embodiment of each of the plates and another fastening means.
Figure 10:
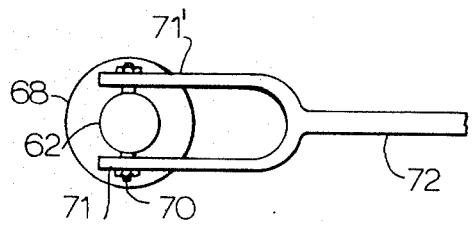
FIG. 10 is a top plan view of the fastening device of FIG. 9, the rest of the device being cut away for clarity.

In FIGS. 9 and 10 there are shown other embodiments of some elements of the device of this invention. In the device there shown, upper plate 55 and lower plate 56 have flat upper surfaces 57 and 58 and flat lower surfaces 59 and 60, respectively. The upper ends of tubes 15 abut against sealant gaskets 27 on surface 59; and the lower ends abut against sealant discs 29 on surface 60, no recesses being provided in either plate to receive the tube ends. In this embodiment, it is advantageous that each plate can be made by casting without any machining so that all surfaces in contact with molten aluminum are of cast metal, advantageously cast iron, as described, and provide better resistance to attack by the aluminum.

The tie rod 62 in the device of FIG. 9 is a straight shaft having flanged end 63, and at its upper portion extending upwardly through aperture 64 in plate 55. A metal sleeve 65, also suitably of cast metal, e.g. cast iron, surrounds shaft 62 above plate 55 and a compressible sealant gasket 66, such as described elsewhere herein, is disposed between sleeve 65 and plate 55 to seal against leakage of molten aluminum between rod 62 and the wall of aperture 64. At the top of sleeve 65 is disposed another such sealant gasket 67 and above that is a washer 68, suitably of steel. A pin 70 passes through shaft or rod 62 and supports a pair of cams 71, 71' and a bifurcated arm 72 which extends from each cam outwardly. Arm 72 can be quickly moved to adjust the position of the cams as rod 62 expands on heating or contracts on cooling, pressing the faces of the cams against washer 68 and holding the sleeve 65 and gasket 66 in sealed relationship with plate 55. In one manner of operation, a counter-weight can be suspended at the outer end of arm 72 to maintain cams 71, 71' in contact with the washer, sleeve and sealant combination to maintain the desired sealed relationship.

Figure 11:
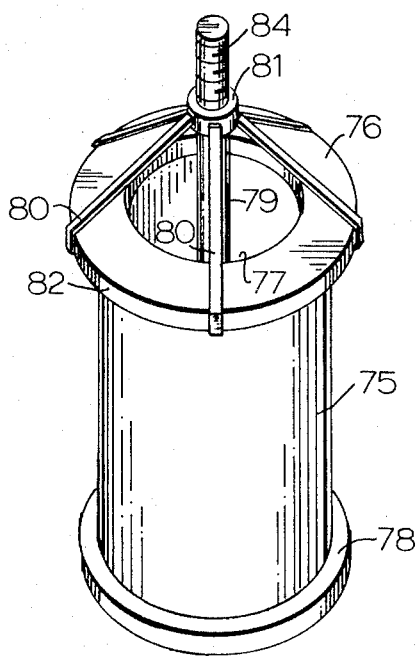
FIG. 11 is a perspective view of another embodiment of the cartridge of this invention, having a simple tube.

In FIG. 11 there is shown a perspective view of another embodiment of the present invention wherein there is employed a single rigid tube 75 and a top plate 76 having a single aperture 77 which registers with the interior passageway of tube 75, and a bottom plate 78 which closes the lower end of tube 75. It will be understood that suitable sealants (not shown) are disposed between the tube ends and the plates. A tie rod 79, extends upwardly from the bottom plate 78 through the tube 75 and aperture 77, and a plurality of arms 80 extend from a collar 81 disposed around rod 79 to the outer edge 82 of plate 76 and clamp over edge 82. Arms 80 thus act to hold plates 76 and 78 and tube 75 together and to center rod 79 when this device is assembled and a fastening means (not shown) is applied to upper extension 84 of rod 79.

Figure 12:
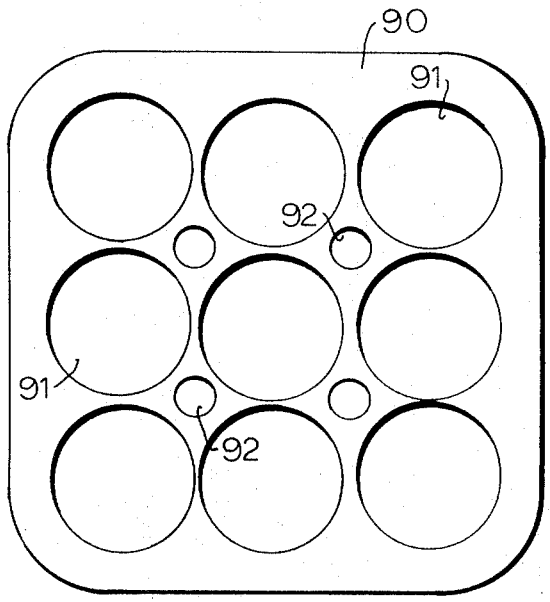
FIG. 12 is a schematic top plan view of a further arrangement of multiple tubes and tie rods.

In FIG. 12 there is shown schematically a top plan view of still another embodiment of the present invention wherein the cartridge is of square horizontal cross-section. In this device, a top plate 90 is provided with nine apertures 91 registering with suitable rigid tubes as described elsewhere herein. There are also provided four secondary apertures 92 to receive four suitable tie rods when assembled. This arrangement has the advantage of providing maximum filtering surface for a given amount of space in a plant installation. The tie rods, fasteners and bottom plate can be generally as elsewhere described herein, the bottom plate being also square in horizontal cross-section.

The following example will illustrate one mode of carrying out the present invention.

EXAMPLE

A filter cartridge 10 was assembled as shown in FIGS. 1 through 5 and was pre-heated to 1,300° F. in an electric oven at the rate of 350° per hour. The assembly was re-tightened by screwing down the nut 33 to take up the thermal expansion of the tie rod 16 before the cartridge 10 was removed from the pre-heater.

The pre-heated cartridge 10 was then lifted out of the pre-heater and placed in the filter chamber 40 with the proper gaskets. Molten 7075 aluminum alloy was filtered through the assembly at a temperature of 1,300° F. and at a rate of 300 pounds per minute while casting two 15″× 49″ sheet ingots. After an ingot length of 114 inches had been reached the metal flow was stopped. The filter cartridge 10 was allowed to remain in the filter chamber while the ingots were removed from the casting station.

Casting was again started and molten 7075 aluminum alloy at 1,300° F. was filtered through the cartridge at the rate of 300 pounds per minute. The process was repeated as described above until filter cartridge was no longer usable or after approximately 100,000 pounds of molten aluminum had been filtered. Filter pressure buildup was good, indicating no leakage for the cast, and no filter tubes broke in the handling. The quanity of the metal cast was also good, with good removal of solid particles of impurities.

It will be understood that the above specific description and drawings have been given for purposes of illustration and explanation only, and that variations and modifications can be made therein without departing from the spirit and scope of the appended claims. For instance, more than one tie rod can be employed, e.g., a pair of such rods disposed in diametric opposition in the assembly. The cast iron of the metal parts used herein, including the walls and parts of the filter chamber and outlet chamber, is advantageously heat-resistant cast iron.

Having now described the invention:
I claim:

1. An assembly for filtering molten aluminum metal comprising a filter chamber and disposed therein in sealed relationship a filter cartridge, means to maintain said chamber and said cartridge in sealed relationship, and outlet means for filtered metal, said cartridge comprising,
   a. a top plate of cast iron having a centrally disposed, tie rod-receiving aperture, an upper surface, a lower surface, and an outer edge,
   b. a bottom plate having an upper surface, a lower surface, an outer edge and a centrally disposed tie rod-receiving aperture aligned with said first-mentioned aperture,
   c. a plurality of rigid filter tubes, each such tube having an interior passageway and consisting essentially of a shaped, fired admixture of refractory particles resistant to molten aluminum and having an average maximum diameter of from about 0.165 mm. to about 2.8 mm. and from 4% to 20% by weight; based on total fired weight of the admixture, of a prefused vitreous product consisting essentially of, by weight, from 15% to 80% boron oxide, from 5% to 50% calcium oxide and from 2% to 60% aluminum oxide and not more than 10% silica,
   d. said top plate having a plurality of secondary apertures disposed between said outer edge and said central aperture, each such second aperture communicating with the interior passageway of a rigid filter tube,
   e. said bottom plate having a plurality of recesses disposed in said upper surface between said outer edge and said central aperture, each such recess being aligned with one said second-mentioned aperture and passageway,
   f. a compressible refractory sealant disposed between the end of each said rigid filter tube and said upper and lower plates to effect sealed relationship therewith, and
   g. a cast iron tie rod extending between said upper and lower plate and through said central apertures to maintain said plates and tubes in sealed relationship, and
   h. means to detachably fasten said plates and said tie rod in firm assembly, and mans to maintain said chamber and said cartridge in sealed relationship.

2. An assembly as in claim 1, having also means to grasp and lift said cartridge.

3. A demountable cartridge for filtering molten aluminum comprising in combination:
   a. at least one filter tube having an interior passageway and formed of a rigid porous material having inner-communicating pores, said material consisting essentially of a fired mixture of refractory particles resistant to attack by molten aluminum, said particles having an average maximum diameter of from about 0.165 to about 2.8 mm, and a prefused vitreous bonding material consisting essentially of, by weight, from 15% to 80% boron oxide, from 5% to 50% calcium oxide and from 2% to 60% aluminum oxide and not more than 10% silica said bonding material being uniformly dispersed throughout said mixture, surrounding said particles and adhering them together,
   b. a first metal plate resistant to attack by molten aluminum adjacent one end of said filtering tube, said plate having at least one aperture adapted to receive a tie rod and an aperture for each filter tube adapted to be in fluid communication with the interior passageway of said filter tube and having a peripheral recess in the under face of the metal plate,
   c. a second metal plate resistant to attack by molten aluminum adjacent the opposite end of said filter tube, said plate having in its upper face a recess for each filter tube and means for attachment thereto of said tie rod,
   d. a compressible refractory sealant material resistant to attack by molten aluminum disposed between the ends of each filter tube and said plates, whereby the plates and tubes are maintained in sealed relationship upon expansion thereof, and
   e. at least one tie rod and fastening means formed of a metal resistant to attack by molten aluminum joining said first and second plates and said tubes so as to effect a sealed relationship between the ends of said filter tubes and said plates, the tie rod passing through the aperture provided for it in the first plate and attaching to the second plate and the tie rod and fastening means being adapted to allow for the tightening of said plates against said tubes when the cartridge is heated to operating temperatures.

4. The cartridge of claim 3 wherein said plates, tie rod and fastening means are of cast iron.

5. The cartridge of claim 3 having a means to grasp and lift said cartridge.

6. The cartridge of claim 3 wherein said compressible refractory sealant material is a fibrous alumina-silica sheet material.

7. The cartridge of claim 3 wherein said refractory particles are alumina.

* * * * *

UNITED STATES PATENT OFFICE
CERTIFICATE OF CORRECTION

Patent No. 3,747,765  Dated July 24, 1973

Inventor(s) Thomas A. Nowak

It is certified that error appears in the above-identified patent and that said Letters Patent are hereby corrected as shown below:

Column 2, Line 7, "us" should be --use--

Column 3, Line 49, "simple" should be --single--

Column 7, Line 33, "quanity" should be --quality--

Column 8, Line 26, "mans" should be --means--

Signed and sealed this 25th day of December 1973.

(SEAL)
Attest:

EDWARD M. FLETCHER, JR.
Attesting Officer

RENE D. TEGTMEYER
Acting Commissioner of Patents